Feb. 27, 1940. R. STUART 2,191,508
PHOTOGRAPHIC FILM CARRIER AND DEVELOPMENT RECEPTACLE
Filed Feb. 6, 1939 2 Sheets-Sheet 1

INVENTOR.
Robert Stuart
BY
M H Loughridge
ATTORNEY.

Feb. 27, 1940.    R. STUART    2,191,508
PHOTOGRAPHIC FILM CARRIER AND DEVELOPMENT RECEPTACLE
Filed Feb. 6, 1939    2 Sheets-Sheet 2
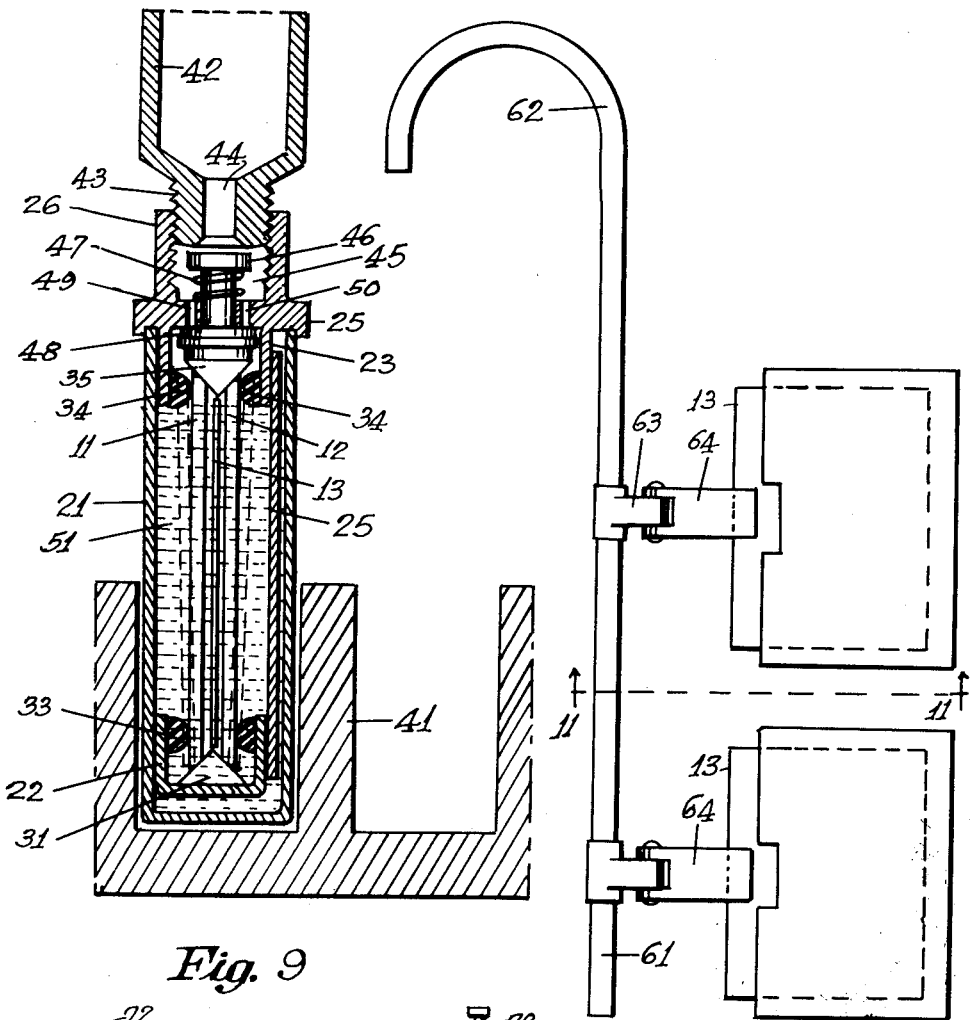
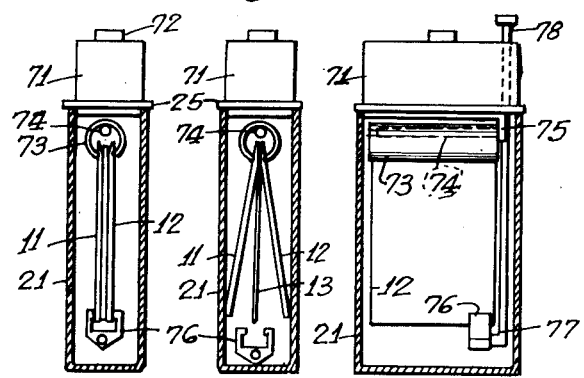
INVENTOR.
Robert Stuart,
BY M. M. Laughridge
ATTORNEY.

Patented Feb. 27, 1940

2,191,508

UNITED STATES PATENT OFFICE 2,191,508

PHOTOGRAPHIC FILM CARRIER AND DEVELOPMENT RECEPTACLE

Robert Stuart, Forest Hills, N. Y.

Application February 6, 1939, Serial No. 254,793

12 Claims. (Cl. 95—90)

This invention relates to a combined film carrier and receptacle for developing fluid whereby a film or plate may be loaded in the carrier, then inserted in a camera for exposure, then removed from the camera in a closed condition and finally a developing fluid is poured into the receptacle or container of the carrier for developing the plate or film, after which it is removed and washed and dried, the whole operation being carried out without the use of a dark room or its equivalent.

More specific objects of the invention include a film carrier or holder which holds the film flat and which has an aperture or a transparent portion in one of the plates exposing the surface of the film upon which the picture is to be taken; this film carrier is mounted in a frame and the frame is enclosed by a sliding receptacle which encloses the entire carrier and frame except at the top where a flange of the frame makes the receptacle lightproof. The carrier is inserted in the camera and the receptacle is withdrawn sufficiently to expose the film for taking the picture, the carrier is then removed from the camera in a closed state and, through a valve in the top of the carrier, developing fluid is poured into the receptacle for developing the picture.

The invention may be used with dry plates for taking the picture, in which case it is necessary only to center the plate in the frame. The invention is also usable for individual films for each picture which are preferably clamped between a pair of glass plates. In the developing operation, in order that the developing fluid may have access to the entire surface of the film the holding plates are separated so as to provide a space between the plates and the film when the developing fluid is poured into the receptacle.

There is a developing fluid commercially available which combines the properties of a developer and a fixing solution in one fluid and which does not overdevelop the subject. When a developing fluid of this type is used the receptacle can be set aside and filled with a measured quantity of the developer for developing the picture subject without attention. When convenient the film is removed from the holder and is transferred to a washing bath in the daylight and after drying the operation is complete.

The invention is carried out by the use of the receptacle which houses the film and protects it from the light before it is exposed, which is adapted to be inserted in the camera for exposing the film and, after removal from the camera, this receptacle is adapted for use as a container for developing fluid so that the picture may be developed and brought into use without the use of a dark room.

These and other objects of the invention will be more particularly understood from the following specification and the accompanying drawings, in which Fig. 1 is an edge view of the film holder;

Fig. 9 is a vertical elevation sectioned on the center line of the carrier showing the application of the developing fluid thereto;

Fig. 10 is a carrier device for supporting the film in the washing bath;

Fig. 11 is a view taken on line 11—11 of Fig. 10;

Figs. 12 and 13 show a side view with the receptacle sectioned and Fig. 14 shows a corresponding front view with the receptacle sectioned of a modified form of carrier.

Figures 1, 2:
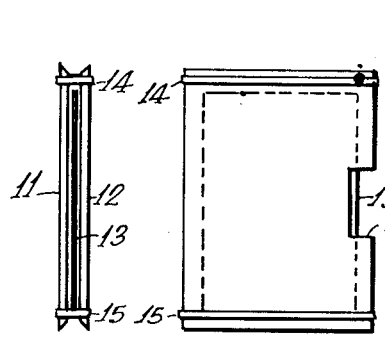
Fig. 2 is a side view of the film holder corresponding with Fig. 1.

In the drawings, 11 is one plate of the film holder and 12 is the opposite plate between which the film 13 is clamped by means of the rubber bands at 14 and 15 surrounding these plates. These plates are preferably made of glass but at least one of them must be transparent or have a transparent aperture therein so that the front of the film can be exposed in the camera. These plates may be notched as indicated at 16 to make the edge of the film available when it is to be removed from the holder.

Figure 5:
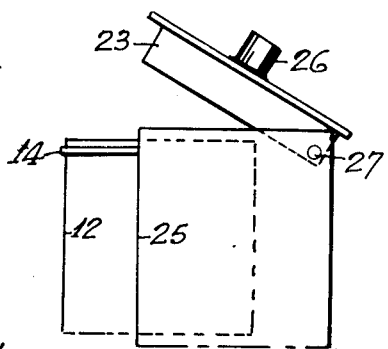
Fig. 5 is a front view of the frame and film holder showing one method of inserting the film holder in the frame.
Figure 7:
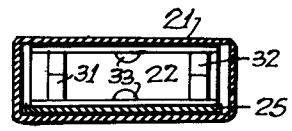
Fig. 7 is a cross section on line 7—7 of Fig. 4.

A frame is provided for the holder comprising a bottom U-shaped member 22 and a top U-shaped member 23 developed from the cover 24; these members are connected by the back plate 25 and the cover member may be pivoted to this back plate as indicated at 27. The holder, Fig. 2, is inserted as indicated in Fig. 5 in the channels formed by 22 and 23 and it is centered in position by the rubber pads 33 at the bottom and 34 at the top. A pair of wedge-shaped members 31 are provided in channel 22 and a wedge 35, developed from a stem in orifice 26, is provided at the top. The plates 11 and 12 of the holder are centered over the apex of each of these wedges and wedge 35 can be depressed so that the wedges 31, together with 35, force the plates 11 and 12 apart and against the rubber cushions 33 and 34 thereby releasing the film from the plates.

Figure 4:
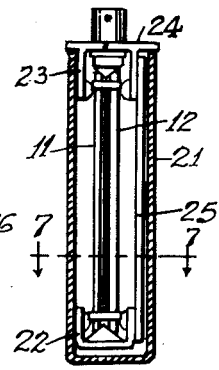
Fig. 4 is a side view of the film holder and frame with the receptacle sectioned.
Figure 3:
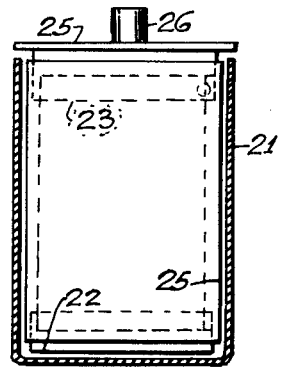
Fig. 3 is a side view of the film holder from the rear with the housing or receptacle sectioned.
Figure 8:
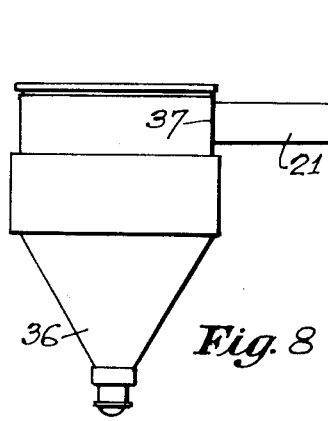
Fig. 8 is a top plan view of a camera showing the application of a film carrier thereto.
Figure 6:
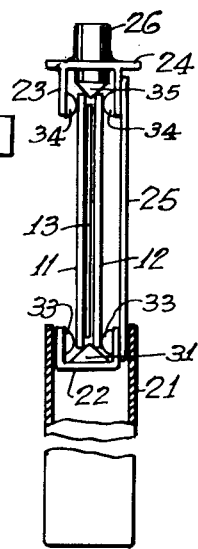
Fig. 6 is a side elevation of the frame and film holder with the receptacle withdrawn to the position necessary for exposing the film.

When the receptacle, or cover, 21 is slid into place as in Fig. 4, the flange of the top 24 makes a light-proof enclosure for the carrier so that after the holder is loaded with the film and the receptacle moved into place, the carrier can be removed from the dark room and stored until used. It is then inserted in the camera 36 at the usual plate opening 37 and after insertion the cover 21 is slid outwardly to the position indicated in Fig. 6 exposing the side of the film 13 opposed to the back plate 25. After exposure the cover 21 is restored and the device removed from the camera for developing purposes.

The application of the developer is shown in Fig. 9 in which a stand 41 is provided to hold one or more of the carriers in a vertical position. A container 42 is provided with a screw neck 43 which screws into the socket 26 and engages the stem 46 and depresses it against spring 47, thereby removing the collar 48 from against the passages 49 and 50 whereby fluid in 42 passes through 44 into chamber 45, and through the passages 49 and 50 into the chamber 51 which is enclosed by the receptacle 21. The wedge-shaped member 35, which may also be cone-shaped, is attached to stem 46 and as this stem is depressed the wedge is forced between plates 11 and 12 and these plates are forced downward against the wedge 31, with the result that they separate from each other and leave a free space around the film 13 in which the developing fluid can circulate. The rubber pads 33 and 34 are made sufficiently soft to enable the plates 11 and 12 to spread under the wedging action. The container 42 may be a flask having a capacity suitable for the receptacle 21, or it may be a funnel by which a measured quantity of developing fluid can be supplied to the container 21. It should be noted that the passages 49 and 50 remain sealed until the neck 43 is screwed down in place and when the container is removed these passages are again sealed.

The developing and fixing operation is usually performed in a few minutes and at any time convenient after this operation the receptacle 21 is slid back, the developing fluid is poured out and may be saved for further operations, and then film is removed to be washed and dried.

The device in Fig. 10 may be used for handling the film after development and can generally be applied without the operator touching the film with the fingers. This comprises a rod 61, hooked at the upper end 62, from which it may be suspended in a jar or tray for washing purposes. It is provided with an arm 63 to which the spring jaw is pivoted at 65 and is arranged to grip the edge of the film 13 and remove it from the holder. Any number of arms 63 may be provided on the rod 61.

This arrangement enables letters and documents produced in an office to be conveniently photographed and the photographs to be developed without delay, without the use of a dark room, and without sending the photographs, after they are taken, away from the desk where the exposure was made. The photographs provide a microfilm record of the subject which is readily reproduced and which is small, compact and easily filed away for future reference.

In the form of carrier shown in Figs. 12, 13 and 14 the plates 11 and 12 are pivotally secured at the top by a C-spring 73 which slides on the rod 74 secured to the top 25 at 75. The C-spring tends to open the plates as indicated in Fig. 13 with the film 13 projecting in the center. The bottom of the plates are clamped together by the clamping member 76 attached to rod 77. This rod can be depressed by plunger 78 to release the plates and expose the film for developing. The developing fluid may be located in reservoir 71 at the top and released by a plunger valve similar to 46.

Having thus described my invention, I claim:

1. A film carrier comprising a holder for the film, a frame engaging said holder and exposing one face of the film and a cup-shaped receptacle slidably enclosing said frame, said receptacle being adapted for insertion in a camera to expose the film when the receptacle is slid to the open position.

2. A film carrier comprising a holder for the film, a frame engaging said holder and exposing one face of the film, means for centering said film in said holder and a cup-shaped receptacle slidably enclosing said frame, said receptacle being adapted for insertion in a camera to expose the film when the receptacle is slid to the open position.

3. A film carrier comprising a holder for the film, a frame comprising a U-shaped member at the top and a U-shaped member at the bottom, a rigid support connecting said members, said members engaging and supporting said holder in a predetermined position and a cup-shaped receptacle slidably enclosing said frame, said receptacle being adapted for insertion in a camera to expose the film when the receptacle is slid to the open position.

4. A film carrier and developing receptacle comprising a holder for the film, a frame engaging said holder and exposing one face of the film, a receptacle slidably enclosing said frame and adapted for insertion in a camera to expose the film, said receptacle also being adapted to act as a receiver for developing fluid for developing the film without removing the film from the receptacle.

5. A film carrier and developing receptacle comprising a holder for the film, a frame engaging said holder and exposing one face of the film, a receptacle slidably enclosing said frame and adapted for insertion in a camera to expose the film, said receptacle also being adapted to act as a receiver for developing fluid for developing the film without removing the film from the receptacle and means for supplying a measured quantity of developing fluid to said receptacle.

6. A film carrier and developing receptacle comprising a frame supporting the film and exposing one face of the film, a removable receptacle enclosing said frame and adapted for insertion in a camera to expose the film, said carrier being removable from the camera in a closed condition and being adapted to act as a receiver for developing fluid for developing the film without removing the film from the receptacle.

7. A film carrier and developing receptacle comprising a holder for the film, a frame supporting holder having a top and bottom member, a removable receptacle enclosing said frame and adapted for insertion in a camera to expose the film, said carrier being removable from the camera in a closed condition and being adapted to act as a receiver for developing fluid for developing the film without removing the film from the receptacle and a valve in the top member through which fluid is supplied to the receptacle.

8. A film carrier and developing receptacle comprising a film, a holder for said film with a plate of glass on each side of the film and means for clamping the plates against the film, a frame for said holder exposing one face of the film, a removable receptacle enclosing said frame and adapted for insertion in a camera to expose the film, said carrier being removable from the camera in a closed condition and being adapted to act as a receiver for developing fluid for developing the film and means for releasing the film from said plates during the developing operation.

9. A film carrier and developing receptacle comprising a film with a plate of glass on each side of the film and means for clamping the plates against the film, a frame for said holder exposing one face of the film, a removable receptacle enclosing said frame and adapted for insertion in a camera to expose the film, said carrier being removable from the camera in a closed condition and being adapted to act as a receiver for developing fluid for developing the film, an orifice with a valve at the top of said frame and a fluid container attached to said orifice and opening said valve to supply fluid to the container.

10. A film carrier and developing receptacle comprising a film, a holder for said film with a plate of glass on each side of the film and means for clamping the plates against the film, a frame for said holder exposing one face of the film, a removable receptacle enclosing said frame and adapted for insertion in a camera to expose the film, said carrier being removable from the camera in a closed condition and being adapted to act as a receiver for developing fluid for developing the film, an orifice at the top of said frame, a stem in said orifice engaging said plates to separate the plates and a fluid container attached to said orifice and depressing said stem to separate said plates.

11. A film carrier and developing receptacle comprising a film, a holder for said film with a plate of glass on each side of the film and means for clamping the plates against the film, a frame for said holder exposing one face of the film, a removable receptacle enclosing said frame and adapted for insertion in a camera to expose the film, said carrier being removable from the camera in a closed condition and being adapted for use as a receiver for developing fluid for developing the film, an orifice at the top of said frame having a stem therein, a wedge in said frame at the bottom of said plates, a second wedge at the top of said plates connected with said stem, a fluid container and means for forcing said wedges to separate said plates as the fluid container is attached to said orifice.

12. A film carrier and developing receptacle comprising a film, a holder for said film with a pair of plates for holding the film flat, a frame for said holder exposing one face of the film, a removable receptacle enclosing said frame and adapted for insertion in the camera to expose the film, said carrier being removable from the camera in a closed condition and being adapted for use as a receiver for developing fluid for developing the film, an orifice with a valve at the top of said frame, a fluid container, a wedge in said frame and a stem in said orifice connected with said valve and said wedge and means for operating said stem to open said valve and force said wedge between said plates as the fluid container is attached to said orifice.

ROBERT STUART.